United States Patent [19]

Kobayashi

[11] Patent Number: 5,282,139

[45] Date of Patent: Jan. 25, 1994

[54] DEVICE FOR PRODUCTION CONTROL AND METHOD FOR PRODUCTION CONTROL USING THE SAME

[75] Inventor: Yasumasa Kobayashi, Suwa, Japan

[73] Assignee: Seiko Epson Corporation, Tokyo, Japan

[21] Appl. No.: 796,033

[22] Filed: Nov. 20, 1991

[30] Foreign Application Priority Data

Nov. 21, 1990 [JP] Japan .................. 2-317565
Nov. 21, 1990 [JP] Japan .................. 2-317566
Nov. 21, 1990 [JP] Japan .................. 2-317567
Nov. 21, 1990 [JP] Japan .................. 2-317568
Nov. 6, 1991 [JP] Japan .................. 3-290032

[51] Int. Cl.$^5$ .............................. G06F 15/46
[52] U.S. Cl. .................... 364/468; 364/131; 364/478
[58] Field of Search .......... 364/468, 478, 131, 138, 364/401, 403

[56] References Cited

U.S. PATENT DOCUMENTS

| 3,845,286 | 10/1974 | Aronstein et al. | 364/468 |
| 4,027,246 | 5/1977 | Caccoma et al. | 364/468 |
| 4,841,431 | 6/1989 | Takagi et al. | 364/187 |
| 4,870,590 | 9/1989 | Kawata et al. | 364/468 |
| 4,958,292 | 9/1990 | Kaneko et al. | 364/468 |
| 5,126,932 | 6/1992 | Wolfson et al. | 364/131 |
| 5,150,288 | 9/1992 | Imai et al. | 364/132 |
| 5,164,905 | 11/1992 | Iwasaki et al. | 364/468 |

Primary Examiner—Jerry Smith
Assistant Examiner—Paul Gordon
Attorney, Agent, or Firm—Scully, Scott, Murphy & Presser

[57] ABSTRACT

The present invention relates to a device for production control which employs control, transport and processing means and which sets optimal priorities according to production conditions that may vary from moment to moment. The present invention also relates in this regard to a method of production control.

2 Claims, 7 Drawing Sheets

| BATCH TO PROCESS | NUMBER OF BATCHES | PRIORITY OF EACH PRODUCTION LOT | | | | | | PRIORITY OF BATCH TO PROCESS (MAXIMUM VALUE OF EACH LOT) |
|---|---|---|---|---|---|---|---|---|
| | | a | b | c | d | e | f | |
| A | 6 | 5 | 3 | 1 | 1 | 1 | 1 | 5 |
| B | 6 | 3 | 3 | 3 | 3 | 3 | 2 | 3 |
| C | 6 | 3 | 3 | 3 | 3 | | | 3 |
| D | 3 | 3 | 3 | 3 | / | / | / | 3 |

FIG.8

| BATCH TO PROCESS | NUMBER OF BATCHES | PRIORITY OF EACH PRODUCTION LOT | | | | | | PRIORITY OF BATCH TO PROCESS (SUM OF EACH LOT) |
|---|---|---|---|---|---|---|---|---|
| | | a | b | c | d | e | f | |
| A | 6 | 5 | 3 | 1 | 1 | 1 | 1 | 12 |
| B | 6 | 3 | 3 | 3 | 3 | 3 | 2 | 17 |
| C | 6 | 3 | 3 | 3 | 3 | - | - | 12 |

FIG.9

| BATCH OF PROCESS | NUMBER OF BATCHES | PRIORITY OF EACH PRODUCTION LOT | | | | | | PRIORITY BATCH TO PROCESS (MEAN VALUE OF EACH LOT) |
|---|---|---|---|---|---|---|---|---|
| | | a | b | c | d | e | f | |
| A | 6 | 5 | 3 | 1 | 1 | 1 | 1 | 12/6 = 2 |
| B | 6 | 4 | 3 | 2 | 1 | 1 | 1 | 12/6 = 2 |
| C | 6 | 3 | 3 | 3 | 3 | 3 | 3 | 18/6 = 3 |

FIG.10

| BATCH OF PROCESS | NUMBER OF BATCHES | PRIORITY OF PRODUCTION LOT | | | | | | PRIORITY OF BATCH TO PROCESS (SUM/ MAXIMUM VALUE OF EACH LOT) |
|---|---|---|---|---|---|---|---|---|
| | | a | b | c | d | e | f | |
| A | 6 | 5 | 3 | 1 | 1 | 1 | 1 | 12/6 = 2 |
| B | 6 | 3 | 3 | 3 | 3 | 3 | 2 | 17/6 = 2.8 |
| C | 6 | 3 | 3 | 3 | 3 | - | - | 12/6 = 2 |
| D | 3 | 3 | 3 | 3 | / | / | / | 9/3 = 3 |

DEVICE FOR PRODUCTION CONTROL AND METHOD FOR PRODUCTION CONTROL USING THE SAME

FIELD OF THE INVENTION

The present invention relates to a device and method for production control for use in semiconductor processes wherein many kinds of integrated circuits are produced together on a single production line.

PRIOR ART

In recent years, as is generally known, several systems have been developed so that a computer is linked with production facilities to centrally control all processes between production planning and the production process itself. Such systems are adapted to, for example, the production of integrated circuits for IC memory. The term "process" as used herein denotes a CVD process wherein an insulating film is provided on a wafer on which integrated circuits are formed, or a diffusion process wherein impurities are introduced onto a surface of a semiconductor. In these processes, many kinds of wafers from production lots corresponding to each kind of article are carried together into a semiconductor manufacturing devices where a preliminary process, a furnace process, and a disposition are performed in sequence.

In the above-mentioned processes, wafers in each production lot corresponding to each kind of article are batch-processed in a semiconductor manufacturing device. For this reason, a series of processes in the semiconductor manufacturing device is called "batch operation." Batch operation is done in a semiconductor manufacturing device installed in each production line. In view of the entire production line, a plurality of batch operations are done simultaneously under different conditions, which is regarded as "parallel processing." Under such circumstances, there is a need for a novel system of production control which can achieve such parallel processing more effectively than ever.

In the conventional system for production control, it is necessary to decide which batch operation should be performed first when a number of batch operations have to be done simultaneously. In such cases, a host computer is operated according to the predetermined selection methods so that a priority level is given to a number of batch operations, and the batch operation receiving the top priority can be selected.

The selection method is described below. The term as used hereinafter is based on the following definition. First, a number of batch operations are respectively called "batch-to-process." Consequently, the "batch-to-process" comprises, as mentioned above, a number of production lots corresponding to each kind of article. Typical selection methods are shown below:

1. Maximum Value Selection Method

In this method, priority levels are primarily found for each production lot forming the batch-to-process so that the top priority level among priority levels can represent a priority level in the batch-to-process. Thus, the batch-to-process with the top priority level can be selected in each batch in which a priority level is defined.

2. Mean Value Selection Method

In this method, mean priority values are found for every production lot so that the mean value can represent the priority level in the batch-to-process. Thus, the batch-to-process with the top priority can be selected for each batch in which a priority level is defined.

3. Sum Selection Method

In this method, sums of priority levels are primarily found for every production lot so that the sums can represent a priority level in each batch-to-process. Thus, the batch-to-process with the top priority level can be selected in each batch in which a priority level is defined.

These methods have different implications. For example, in maximum value selection (Method 1 above), the batch-to-process with the top priority is selected exclusively regardless of whether the number of production lots is large or small. Accordingly, this selection method can be used in case on-time delivery is more important than production efficiency. Further, in Methods 2 to 3 above, production quantity and the priority of each production lot are taken into consideration.

In the conventional system for production control, one of these methods tends to be rigidly used, because in a routine production line where the number of production lots is constant and the production quantity does not vary, the use of only one selection method is enough as long as the desired production form can be implemented by this method. However, the use of only one selection method involves such a problem that the most appropriate priority cannot be set under production conditions where both the number of production lots and production quantity may vary significantly.

SUMMARY OF THE INVENTION

Therefore, an object of the present invention is to provide a device for production control and a method for production control using this device which enables an optimal priority to be set according to production conditions that may vary from moment to moment.

The device for production control according to the present invention is therefore characterized in that it comprises:

(1) A control means that provides at least each production lot with production instructions information which contains priority information needed to define the order of processing; the control means defines the content of the next manufacturing process based on the current manufacturing conditions, which are identified by lot information that denotes the attributes of each production lot, information that denotes conditions under which each production unit is transported (hereinafter referred to as the "primary condition information") and information that denotes conditions under which each production lot is processed (hereinafter referred to as the "secondary condition information");

(2) A transport means that transports the predetermined production lots based on the production instructions information; the transport means is capable of forming and outputting the primary condition information; and (3) A processing means that processes the production lot transported by the transport means; the processing means is capable of forming and outputting the secondary condition information.

According to the present invention, the control means provide production instructions information based on lot information including a priority of a production lot and production conditions so that a transport means transports the predetermined production lot according to the production instructions information and outputs the primary condition information that denotes production conditions. On the other hand, the processing means performs a processing based on the production instructions information and outputs the secondary condition information denoting production conditions for the production lot carried by the transport means. Further, the control means determines a new priority based on the priority level and the production conditions for each manufacturing process in case there are more than one manufacturing processes to be performed simultaneously. It is therefore possible to set the optimal priority according to production conditions which may vary moment by moment and to implement efficient production by processing according to the new priority.

Furthermore, a method for production control according to the invention is characterized in that it comprises:

(1) A first process in which at least each production lot is provided with production instructions information which contains priority information needed to define the order of processing; the process defines the content of the next manufacturing process based on the current manufacturing conditions, which are identified by lot information that denotes the attributes of each production lot, information that denotes conditions under which each production unit is transported (hereinafter referred to as the "primary condition information" and information that denotes conditions under which each production unit is processed (hereinafter referred to as the "secondary condition information");

(2) A second process in which the predetermined production lot is transported according to the production instructions information and the primary condition information is formed and output; and (3) A third process in which the production lot transported in the 2nd process is processed based on the production instructions information and the secondary condition information is formed and output.

DESCRIPTION OF THE PREFERRED EMBODIMENTS

Figure 1:
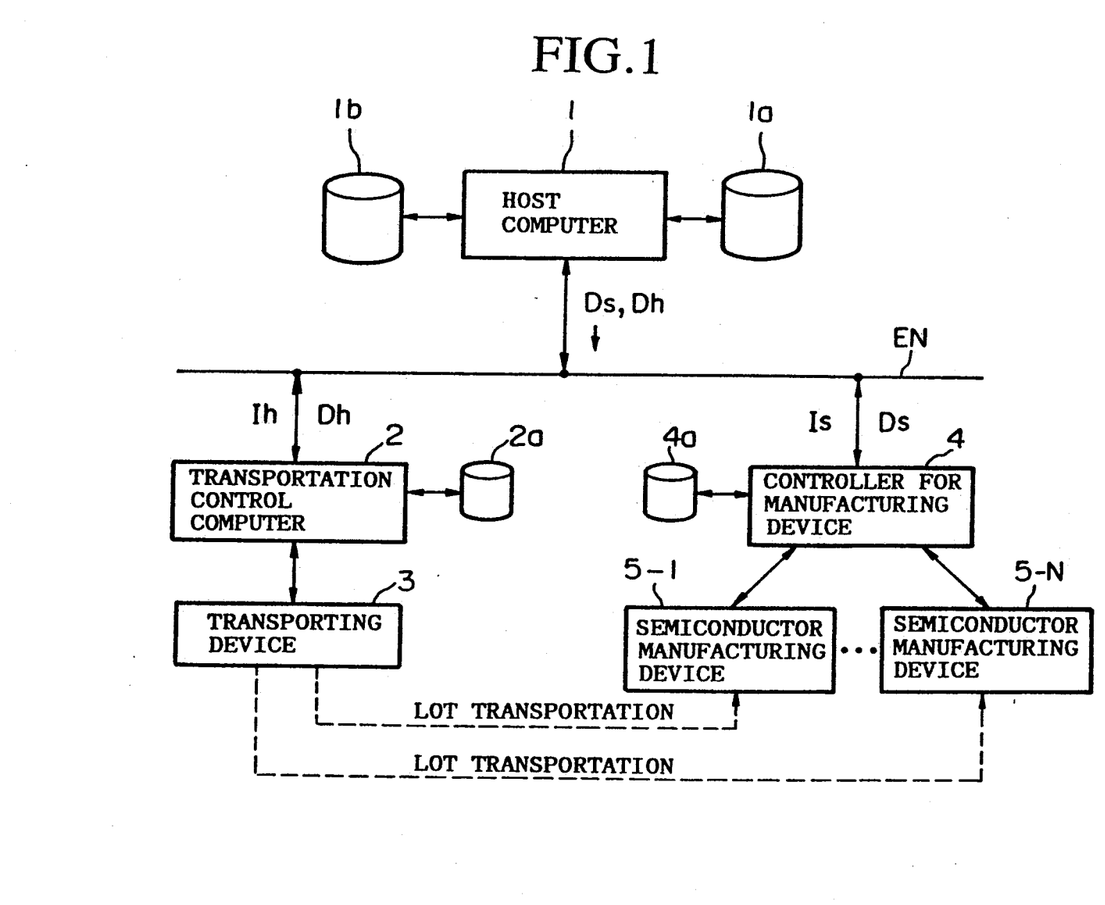
FIG. 1 is a block diagram denoting the whole system according to one embodiment of the present invention.

Embodiments of the present invention are described with reference to the drawings. FIG. 1 is a block diagram showing a schematic construction of a system for production control according to one embodiment of the invention. In the drawing, the embodiment illustrates a system applied to a semiconductor process factory. In FIG. 1, reference numeral 1 denotes a host computer to monitor and control each section of the system. Reference number 2 denotes a transportation control computer connected to the host computer 1 through Ethernet EN.

Reference number 3 denotes a transporting device that carries a production lot according to instructions given by the transportation control computer (2). Reference number 4 denotes a controller for a manufacturing device connected to the host computer (1) through Ethernet EN. Reference number 5-1 to 5-N indicate semiconductor manufacturing devices each of which is installed in each production line and in each of which the above mentioned batch operation (semiconductor manufacturing process) is conducted for production lots carried by the transporting device.

Reference number 1a denotes a lot information management file that can be accessed by the host computer (1). In the lot information management file (1a), lot information on each kind of article is stored as a data base. The lot information comprises identification data for each production lot produced by the host computer (1) based on production planning. The identification data comprises, for example, data to denote the kind, the priority, and the time limit of delivery in each production lot, data to denote the content of a batch operation performed for the production lot, data to denote the progress of batch operation, and data to denote a place where the production lot is stored and the like.

Reference number 1b denotes an event history file. A production event data Is and a transportation event data Ih, as described in the following, are stored in the event history file (1b). Production event data Is, which is information provided by the controller (4) for a manufacturing device, denotes conditions under which the semiconductor manufacturing device is worked. The transportation event data Ih, which is information provided by the transportation control computer (2), denotes conditions of the transporting device (3). This data is provided to the host computer (1) through Ethernet EN whenever an event is reported, and is simultaneously updated in the event history file (1b). The file (1b) permits the user to grasp all system conditions at any given moment.

The host computer (1), in which the processing conditions of the transporting device (3) and the semiconductor manufacturing apparatus (5) are grasped based on the content of the event history file (1b), produces production instructions data Ds and transportation instructions data Dh, as described below, in accordance with the processing conditions and the content of the lot information management file (1a). When this data is produced by the host computer, a priority is given to the batch operation.

The production instructions data Ds, which is given to the controller for the manufacturing device (4), is obtained by adding a priority for batch procession to the above-mentioned identification data in each production lot. The production instructions data Ds, for example, can be transferred in real time from the host computer (1) to the controller for the manufacturing device (4) according to the number of production lots to be processed per day. The so-transferred production instructions data Ds is fetched in the controller for the manufacturing device (4) and thereafter stored in the production instructions file (4a).

The controller for the manufacturing device (4) is connected to the semiconductor manufacturing devices (5-1 to 5-N) and is online to monitor the operating condition of these devices, and allows the load condition of each device to be recorded in the predetermined area of the production instructions file (4a). Further, the controller (4) can also supply production instructions data Ds to the predetermined semiconductor manufacturing device (5) according to the order of priority, while giving consideration to the load condition of each semiconductor manufacturing device (5). For instance, the production instructions data Ds, which is given top priority, is fed to the semiconductor manufacturing device (5) whose load is below the rated capacity.

The semiconductor manufacturing devices (5-1 to 5-N) can interpret the fed production instructions data Ds to perform a batch operation. Namely, the production instructions data Ds, as mentioned above, which includes data denoting a kind of production lot, processing conditions and the like, must be interpreted. The semiconductor manufacturing devices (5-1 to 5-N) report to the controller of the manufacturing device (4) their own operating conditions.

The occurrence of events may be reported in case, for example, the process proceeds to another step or the predetermined process has been finished. This event report is updated in the production instructions file (4a) through the controller (4). At this time, the controller (4) produces the above-mentioned production event data (Is) and outputs it to the host computer (1).

Subsequently, the transportation instructions data Dh, which is fed to the transport control computer (2), extracts data denoting a place where a production lot is stored or a place to which a production lot is transported from the above mentioned identification data in each production lot. This data has priority for batch processing. The transportation instructions data Dh, for example, can be transferred in real time from the host computer (1) to the transportation control computer (2) according to the number of production lots to be processed per day. The transferred transportation instructions data (Dh) is once fetched in the transportation control computer and thereafter stored in the transportation instructions file (2a).

The transportation control computer (2) reads the transportation instructions data (Dh) stored in the transportation instructions file (2a), and the data is then fed to the transporting device (3). The computer (2) is online to monitor the operating conditions of the transporting device (3) and records in the predetermined area of the transportation instructions file (2a) the conditions at which a production lot is carried to each production line. On the other hand, the transporting device (3) carries the predetermined production lot to the semiconductor manufacturing devices (5-1 to 5-N) based on the transportation instructions data (Dh) supplied.

If the conditions of the transporting device (3) itself vary; that is, whenever it starts or finishes the operation, the transporting device (3) reports this event to the transportation control computer (2). This event report is updated in the transportation instructions file (2a) through the computer (2). At this time, the computer (2) produces the above mentioned transportation event data (Ih) and outputs it to the host computer (1).

The operation of an embodiment according to the above mentioned structure will be described hereinafter with reference to FIGS. 2 to 10. It is assumed that the production control system has already been operated. The operation of the host computer (1) determines the priority for batch processing according to the production conditions. The operation can be achieved by a main routine, a batching time examining routine, a batching routine, and a top-priority batch determining routine. These routine operations are described below.

1. Main Routine Operation

Figure 2:
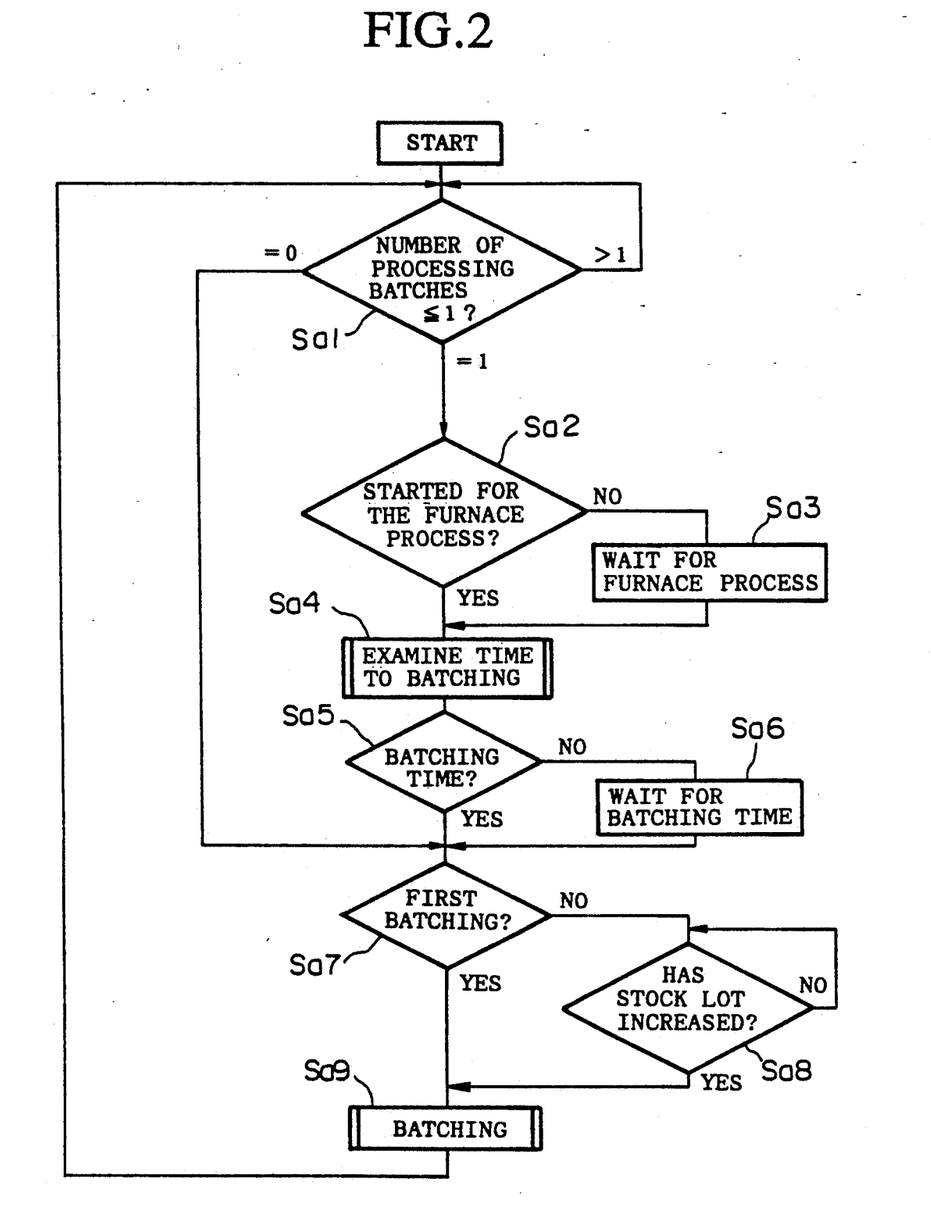
FIG. 2 is a flow chart showing the operation of a main routine according to the same embodiment.

Each production line starts to operate after each section of the system is initialized. The main routine (FIG. 2) is started in the host computer. The main routine begins with Step Sa1 (FIG. 2). Step Sa1 decides whether the number of batches operated in the process is less than or equal to 1. Namely, the host computer (1) checks the processing condition of each semiconductor manufacturing devices (5-1 to 5-N) according to the above mentioned production event data (Is).

If there are 2 or more batches which are instructed to be treated are present in the semiconductor manufacturing device (5), the process is on standby because the host computer cannot indicate the next batch operation. The condition, in which there are 2 or more batch operations, means that 1 batch is operated in process and the other is to be operated. Nevertheless, if the number of batches operated in process is equal to 0, that is, the semiconductor manufacturing device (5) is not provided with ensuing production instructions data, the process proceeds to Step Sa7.

When the number of batches operated in process is equal to 1, that is, when there is a batch operation conducted in process, the process proceeds to Step Sa2. Step Sa2 decides whether the treatment of the batch in a diffusion furnace starts. If the semiconductor manufacturing device does not start to perform the diffusion furnace process, the decision results in a "NO," and the process proceeds to Step Sa3 and is on standby until the diffusion furnace process starts.

On the other hand, if the process in the furnace is started, the decision results in a "YES" and the process proceeds to Step Sa4. In Step Sa4, the batching time examining routine is performed to find a suitable time to start the next batch operation. This routine is described in detail later.

Next, Step Sa5 determines whether time to start a batch operation is found in the batching time examining routine. If it is not the time to start batching, the decision results in a "NO" and the process proceeds to Step Sa6 and goes on standby, and thereafter proceeds to Step Sa7.

Step Sa7 decides whether the batching is the first one. In the batching, the host computer (1) produces the production instructions data (Ds) according to the lot information. If it is the first batching, the decision results in a "YES" and allows the batching to be performed because the production condition may not vary soon after the production line is started. On the other hand, in subsequent batchings, the decision results in a "NO" because a batching according to the variation of the production condition is required and the process proceeds to Step Sa8.

Step Sa8 decides whether the number of stock lots is increasing in accordance with variations in the production condition. Variations in the stock lot can be monitored by retrieving data from the lot information management file (1a). If the stock lot has not increased, the process is on standby until the lot information management file (1a) has been updated. If the stock lot increases, the decision results in a "YES," and the process proceeds to Step Sa9. In Step Sa9, a batching routine is started to give production instructions according to the lot information.

In the subsequent operation, Steps Sa1 to Sa9 are repeated to control the production conditions of each production line. In the host computer, the lot information is updated each time a production process has been finished according to the above mentioned production event data (Is) and transportation event data. The above-mentioned batching time examination operation and batching are performed according to the updated lot information. Thus, the main routine can control the operations whose production conditions may vary with time.

2. Batching time Examining Routine Operation

Figure 3:
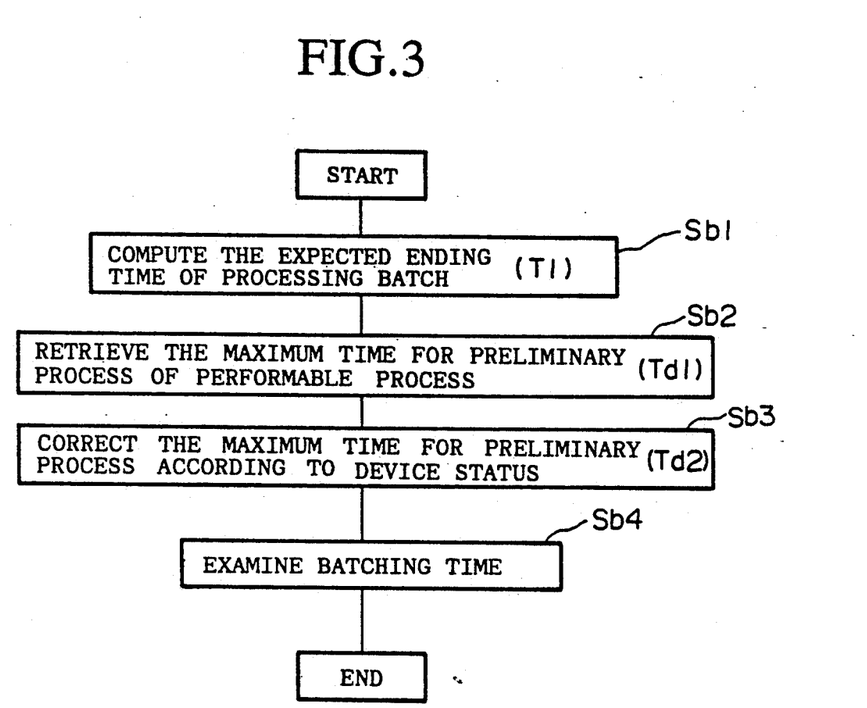
FIG. 3 is a flow chart showing the operation of a batching time examining routine according to the same embodiment.
Figure 4:
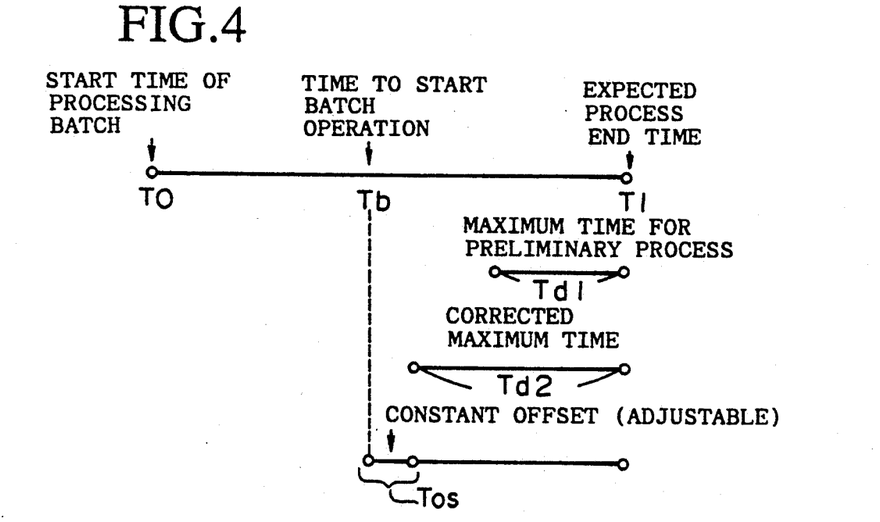
FIG. 4 is a diagram explaining the batching time Tb according to the same embodiment.

When the process of the host computer 1 proceeds to Step Sa4, a batching time examining routine, as shown in FIG. 3, is started so as to perform Step Sb1. In Step Sb1, the expected ending time T1 (FIG. 4) is computed to denote when the batch operation now in progress will end in the semiconductor manufacturing device. Next, the process proceeds to Step Sb2 to retrieve from the lot information the maximum processing time of the preliminary process included in the batch processing and sets the retrieved maximum time as the maximum time for preliminary process Td1 (FIG. 4). "Preliminary process" as used herein is a process, such as the wafers washing process, that is performed before the process proceeds to the diffusion furnace process.

Subsequently, the process proceeds to Step Sb3 and the above-mentioned maximum time for preliminary process Td1 is corrected to compute the corrected maximum time for preliminary process Td2 (refer to FIG. 4). Thereafter, the process proceeds to Step Sb4. The correction is a time equivalent to a delay time corresponding to the load condition of the semiconductor manufacturing device (5). Then, in Step Sb4, a batching time Tb is computed for the next batch operation. The above mentioned expected ending time T1 minus the corrected maximum time for preliminary process Td2, moreover, minus the offset time Tos, as an adjustment time which is changeable, leaves the batching time Tb (refer to FIG. 4).

The offset time (Tos) is a timing margin needed for when the next batch operation begins. Thus, the batching time (Tb) is computed because the next batch processing should start to run the moment the batch processing operated in progress ends. This eliminates wasted time from the production process.

3. Batching Routine Operation

When the process of the host computer (1) proceeds to Step Sa9, the batching routine (FIG. 5) is started so as to perform Step Sc1. This process creates a candidate list that denotes the production lots constituting the next batch operation as the process proceeds to Step Sc1. That is to say, the host computer (1) can grasp the production condition of each production line from the event history stored in the event history file (1b) and read the production lot corresponding to the production conditions in the lot information management file (1a) to build a list.

Figure 5:
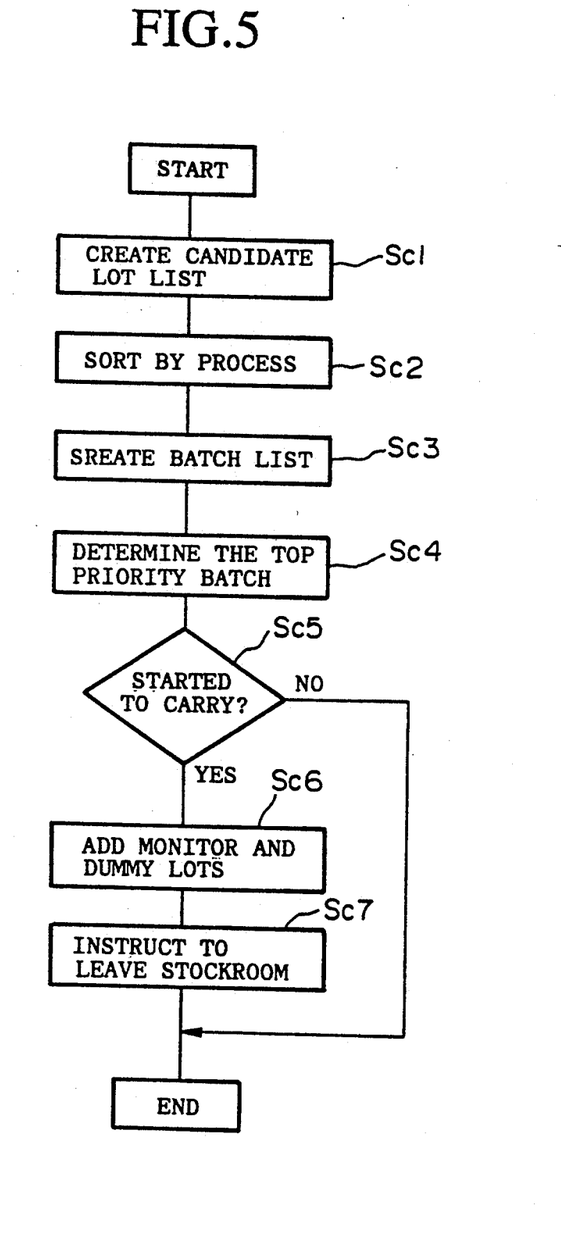
FIG. 5 is a flow chart showing the operation of a batching routine according to the same embodiment.

Consequently, the process proceeds to Steps Sc2 and Sc3 to sort the production lot in the list in the order in which each process is performed, and builds a batch list for each process. The batch list corresponds to the above-mentioned production instructions data (Ds). Then, the process proceeds to Step Sc4 to perform the top-priority batch determining routine, which determines the top priority in the batches-to-process constituting the batch list. The operation of the top-priority-batch determining routine is described later.

Further, Step Sc5 decides whether each production lot, which constitutes the batch which is given top priority by the above mentioned routine, can be started to be carried to the semiconductor manufacturing device (5); namely, whether the above mentioned transportation instructions data Dh can be supplied to the transportation control computer (2). If it is not time to perform transportation, the decision results in a "NO" and this routine ends, returning to the main routine.

On the other hand, if each production lot is ready to be carried, the decision results in a "YES" and the process proceeds to Step Sc6. In Step Sc6, a monitoring lot or a dummy lot is added to each production lot, which constitutes the batch-to-process with the top priority. Moreover, the process proceeds to Step Sc7 to supply the transportation instructions data (Dh), which instructs the production lot to leave a stock-room, to the transportation control computer (2). Thereby, the transporting device (3) can carry each production lot with top priority to the specified semiconductor manufacturing device (5).

4. Routine to Determine Top Priority Batches

Figure 6:
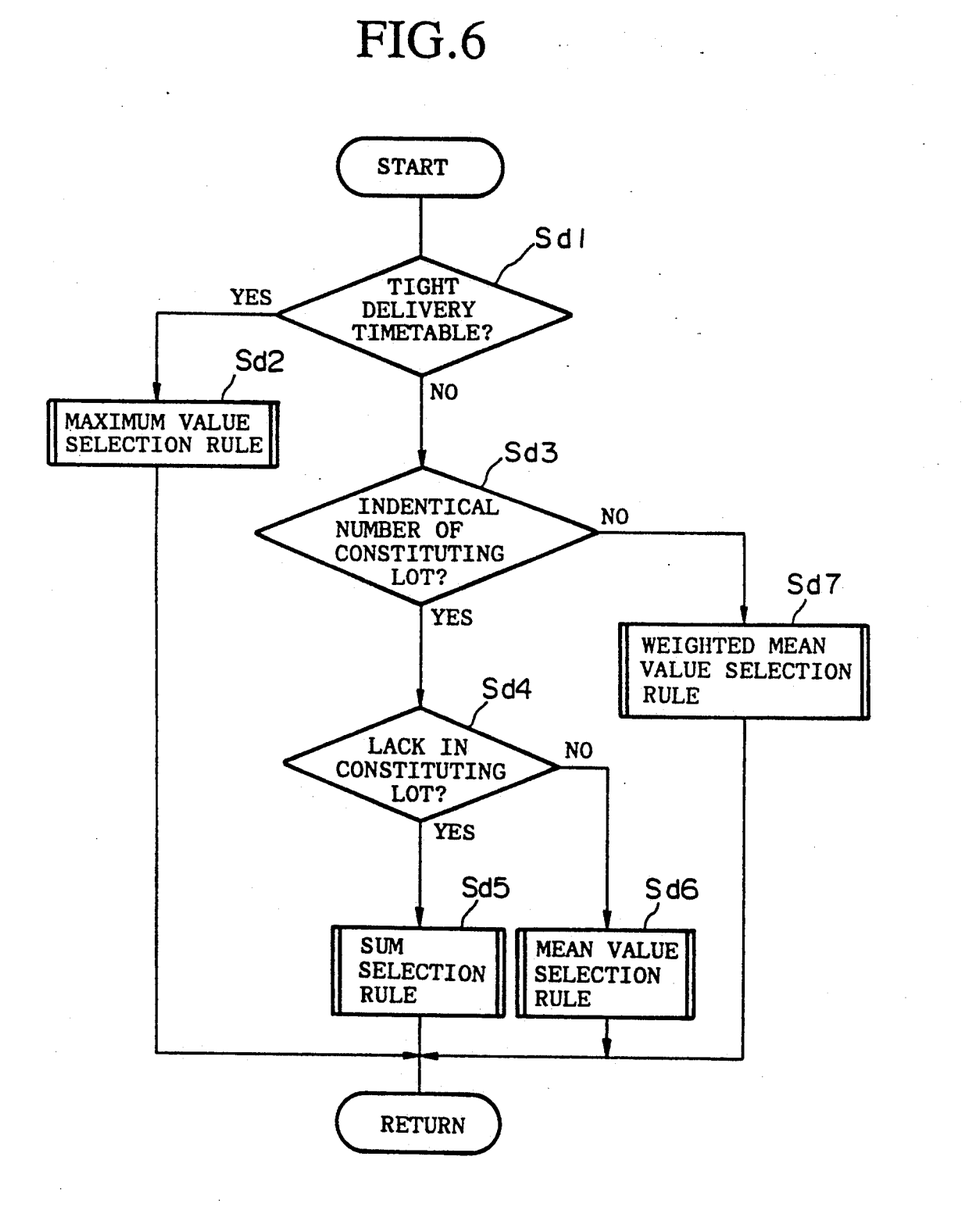
FIG. 6 is a flow chart showing the operation of routine that determines a top-priority batch according to the same embodiment.

When the host computer (1) proceeds to the above-mentioned Step Sc4, the top-priority-batch determining routine performs Step Sd1. Step Sd1 decides whether there are any batches-to-process with severe delivery schedules in the above mentioned batch list. If there are, the decision results in a "YES" and the process proceeds to the next Step Sd2. Step Sd2 invokes maximum value selection, and the routine ends.

Figure 7:
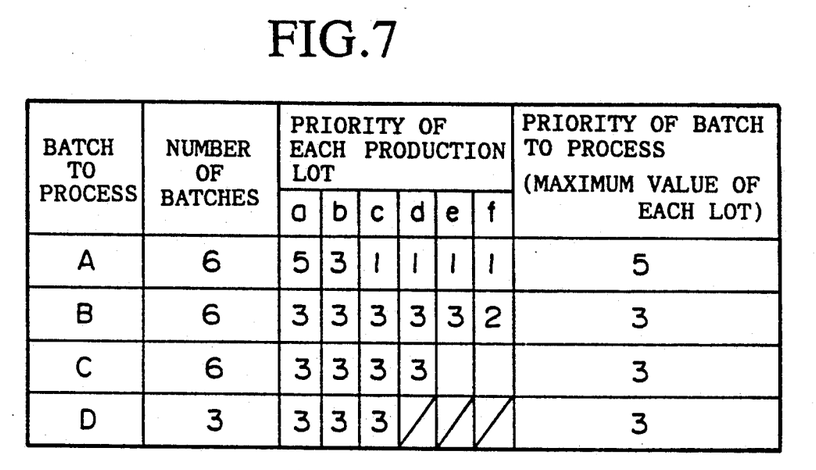
FIG. 7 is a diagram explaining maximum value selection method according to the same embodiment.

Maximum value selection is described with reference to FIG. 7. In the figure, A to D denote batches-to-process stored in the batch list. Batches-to-process A to C correspond to production lots a to f. Batch-to-process D corresponds to production lots a to c. In each production lot, priorities a to f are set to any one of numbers 1 to 5, 1 denoting lowest priority and 5 denoting top priority.

If maximum value selection method is adopted, the maximum of all production lots priorities out of batches-to-process A to D is regarded as the priority of each batch-to-process A to D. Accordingly, the priority of each production lot becomes more important than the quantity of the production in the whole manufacturing process or the production capacity. Therefore, this method should be adopted if it is necessary to give priority to the process of the production lot whose delivery schedule is very near even if the production quantity is lessened.

Figure 8:
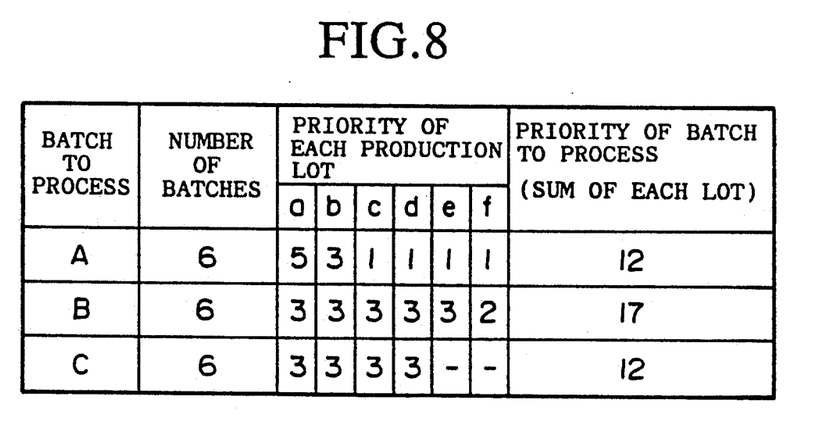
FIG. 8 is a diagram explaining sum selection method according to the same embodiment.
Figure 9:
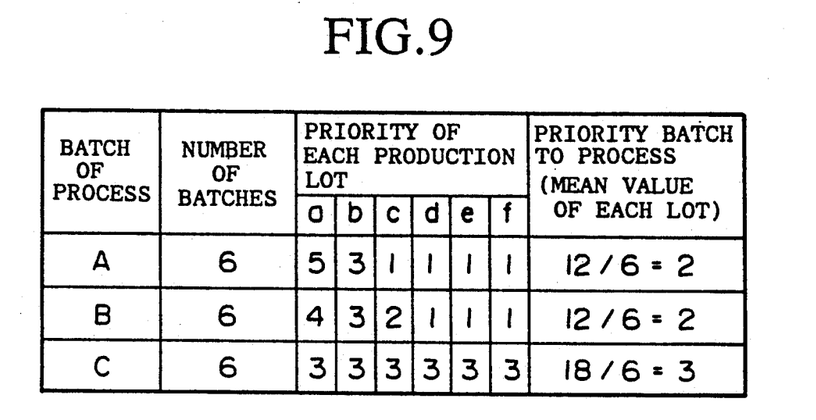
FIG. 9 is a diagram explaining mean value selection method according to the same embodiment.

On the other hand, if no batch in the batch list to be processed is under a tight delivery time frame, the process proceeds to Step Sd3. Step Sd3 decides whether the number of each production lot constituting the batch-to-process is equal to each other. As shown in FIG. 8, if batches-to-process A to C have an equal number of constituting lots; the decision results in a "YES" and the process proceeds to Step Sd4.

Step Sd4 decides whether each production lot constituting the batch-to-process has any "lack." The "lack" of the production lot means that the number of candidate lots is smaller than that of constituting lots even though the number of constituting lots is defined. For example, such "lacking lots" correspond to production lots e and f in batch-to-process C in FIG. 8. In case some production lots are lacking, the decision results in a "YES" and the process proceeds to Step Sd5. Step Sd5 invokes sum selection.

If the sum selection method is invoked under the conditions in FIG. 8, the sum of each priority in batch-to-process A is "12," the sum of each priority in batch-to-process B is "17," the sum of each priority in batch-to-process C is "12." Therefore, batch-to-process B is selected because of the maximum sum. Thus, if each batch-to-process is compared by the sum of the priority of each production lot constituting the batch-to-process, the batch-to-process with high average priority should be selected. Furthermore, the batch-to-process with some lacking lots can be hardly selected. As a result, it is possible to maintain the production quantity while the batch-to-process with a high average priority is processed.

In Step Sd4, if the production lots constituting the batches-to-process have no lack, the decision results in a "NO" and the process proceeds to Step Sd6, and mean value selection method is adopted. For example, under the conditions shown in FIG. 9, this method selects batch-to-process C, whose the mean priority value is largest in each production lot. Thus, with mean value selection method, the batch-to-process having the production lot with the highest priority is selected.

Each method described above assumes that the number of constituting lots is equal. In contrast, if the number of constituting lots is not equal due to the process condition or the variety of the processes, the decision results in a "NO" and the process proceeds to Step Sd7, at which weighted mean value selection method is adopted. Weighted mean value selection method is a method in which the value, which divides the number of the constituting lots into the sum of the priority of each production lot constituting the batch-to-process, is regarded as the priority of the batch-to-process.

Figure 10:
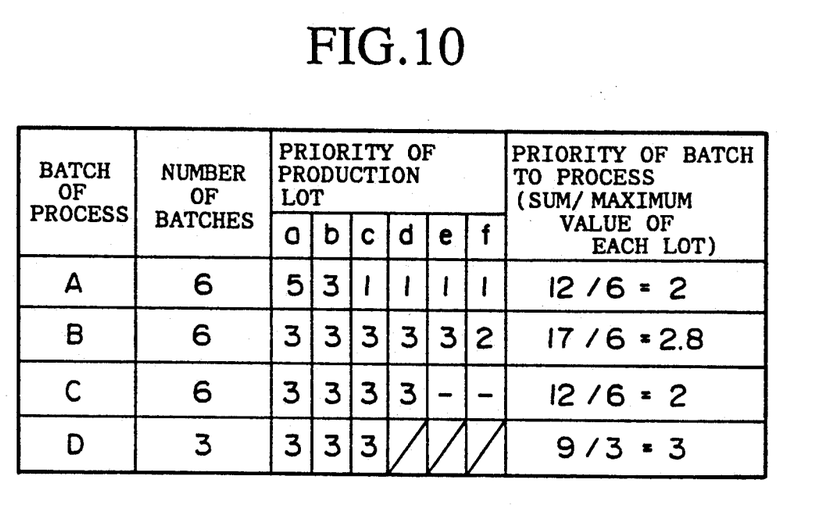
FIG. 10 is a diagram explaining weighted mean value selection method according to the same embodiment.

For example, given batches-to-process A to D under the conditions shown in FIG. 10, each weighted mean value is 2, 2.8, 2, and 3, so batch-to-process D is selected because of its top priority.

Thus, if the priority of the batch-to-process is denoted by the weighted mean value, it is possible to select the batch-to-process in which many production lots have a relatively high priority without the number of constituting lots being different due to the process conditions or varieties in the processes. Using this method, the production lot with the highest average priority can be provided with a semiconductor manufacturing device (5), and the device (5) can be operated efficiently.

As explained above, in the system for production control according to the embodiment, the host computer (1) is operated to control the transporting device (3) and each semiconductor manufacturing devices (5-1 to 5-N) for production planning. In particular, it is always possible to maintain efficient production because concurrent batches-to-process can be selected according to the production conditions. That is, the host computer (1) monitors the operating conditions of the transporting device (3) and semiconductor manufacturing devices (5-1 to 5-N) and selects the proper batch-to-process so that these devices are given appropriate loads so as to minimize dead time.

What is claimed is:

1. A device for production control which comprises:
   (1) a control means for generating production instruction data regarding a subsequent production process, which production instruction data is provided to each production lot and which contains (i) priority data needed for defining an order of processing (ii) lot information depicting attributes of each production lot, (iii) primary condition information depicting conditions under which each production lot is transported and (iv) secondary condition information depicting conditions under which each production lot is processed;
   (2) a transport means for transporting a predetermined production lot based on said production instruction data and for forming and outputting said primary condition information;
   (3) a processing means for processing said predetermined production lot transported by said transport means based on said production instruction data and for forming and outputting said secondary condition information, wherein said control means further comprises:
      (a) a batching time examining means for computing, when a plurality of production processes are to be performed simultaneously, an expected ending time of each production process and when said subsequent production process should start;
      (b) a batching means for computing production lots which can be processed based on said primary and secondary condition information, and for creating a candidate list of production lots for said subsequent production process, said production lots on said candidate list being sorted according to the order in which each subsequent production process is performed, said batching means conveying said order to each device in said subsequent production process;
      (c) a top priority batch determining means for defining priority for each subsequent production process from said list based on priorities of the production lots for said subsequent production process,
   said control means determining each priority of said plurality of production processes when the same are performed simultaneously and said control means producing production instruction that determines production of the top priority.

2. A method for production control which comprises:
   (1) a first process for generating production instruction data regarding a subsequent production process which production instruction data is provided to each production lot and which contains (i) priority data needed for defining an order of processing (ii) lot information depicting attributes of each production lot, (iii) primary condition information depicting conditions under which each production lot is transported and (iv) secondary condition information depicting conditions under which each production lot is processed;
   (2) a second process for transporting a predetermined production lot based on said production instruction data and for forming and outputting said primary condition information;

(3) a third process for processing said predetermined production lot transported by said second process based on said production instruction data and for forming and outputting said secondary condition information, wherein said first process further comprises:

(a) a batching time examining process which computes, when a plurality of production processes are to be performed simultaneously, an expected ending time of each production process and when said subsequent production process should start;

(b) a batching process which computes production lots which can be processed based on said primary and secondary condition information, and which creates a candidate list of production lots for said subsequent production process, said production lots on said candidate list being sorted according to the order in which each subsequent production process is performed, wherein said batching process conveys said order to each device in said subsequent production process;

(c) a top priority batch determining process which defines priority for each subsequent production process from said list based on priorities of the production lots for said subsequent production process, said first process determining each priority of said plurality of production processes when the same are performed simultaneously and said first process producing production instruction data that determines the production of the top priority.

* * * * *